(12) United States Patent
Yan et al.

(10) Patent No.: US 10,248,980 B2
(45) Date of Patent: Apr. 2, 2019

(54) METHOD AND DEVICE FOR SELECTING A SERVICE PROCESSING MODE BASED ON HISTORICAL SUCCESS RATES

(71) Applicant: Alibaba Group Holding Limited, Grand Cayman (KY)

(72) Inventors: Weijie Yan, Hangzhou (CN); Shuangfeng Li, Hangzhou (CN); Tong Zhu, Hangzhou (CN); Zidong He, Hangzhou (CN); Kai Xu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 140 days.

(21) Appl. No.: 15/208,880

(22) Filed: Jul. 13, 2016

(65) Prior Publication Data

US 2017/0019500 A1    Jan. 19, 2017

(30) Foreign Application Priority Data

Jul. 15, 2015  (CN) .......................... 2015 1 0415993

(51) Int. Cl.
  *G06F 15/173* (2006.01)
  *G06Q 30/06* (2012.01)
  *G06Q 20/00* (2012.01)

(52) U.S. Cl.
  CPC ............. *G06Q 30/06* (2013.01); *G06Q 20/00* (2013.01); *G06Q 30/0609* (2013.01)

(58) Field of Classification Search
  USPC .................... 709/203, 223, 226, 228, 229
  See application file for complete search history.

(56) References Cited

U.S. PATENT DOCUMENTS 6,847,988 B2   1/2005  Toyouchi et al.
7,117,263 B1  10/2006  Bhoi et al.
          (Continued)

FOREIGN PATENT DOCUMENTS

CN    104281940 A  *  1/2015  .......... G06F 3/0482
JP    2009205234 A  *  9/2009
WO    2015101171 A1    7/2015

OTHER PUBLICATIONS

International Search Report & Written Opinion to corresponding International Application No. PCT/US16/42185 dated Sep. 28, 2016.

*Primary Examiner* — Liang Che A Wang
(74) *Attorney, Agent, or Firm* — James J. DeCarlo; Greenberg Traurig, LLP

(57) ABSTRACT

A service processing device and method include receiving a service processing request including data interaction processing mode information and account information, and determining, based on the service processing request, one or more data interaction processing mode candidates for executing the service processing request. The data interaction processing mode candidates are determined from a plurality of data interaction processing modes. Each of the data interaction processing modes includes processing parameters, and at least one of the processing parameters is different between different data interaction processing modes. Each of the one or more data interaction processing mode candidates has an associated processing success rate based on a historical processing record of the data interaction processing modes. The method also includes determining, based on the processing success rates, a data interaction processing mode candidate as a data interaction processing mode for executing the service processing request.

20 Claims, 4 Drawing Sheets

(56) References Cited

U.S. PATENT DOCUMENTS

| | | |
|---|---|---|
| 8,537,985 B2 | 9/2013 | Reddy et al. |
| 8,812,626 B2 | 8/2014 | Colombo et al. |
| 8,897,227 B2 | 11/2014 | Li |
| 9,858,254 B2 * | 1/2018 | Carrier .................. G06F 17/243 |
| 2002/0143641 A1 * | 10/2002 | Thomas .................. G06F 9/548 |
| | | 705/26.44 |
| 2003/0140123 A1 * | 7/2003 | Master .................. H04W 48/12 |
| | | 709/220 |
| 2005/0080893 A1 | 4/2005 | Castellanos et al. |
| 2008/0313090 A1 | 12/2008 | Portman et al. |
| 2009/0019113 A1 * | 1/2009 | Wu ..................... H04L 12/1881 |
| | | 709/204 |
| 2010/0057937 A1 * | 3/2010 | Macken .................. G06F 9/541 |
| | | 709/246 |
| 2011/0190595 A1 * | 8/2011 | Bennett ............. A61B 1/00016 |
| | | 600/301 |
| 2013/0253904 A1 * | 9/2013 | Heller ............... G06F 17/30905 |
| | | 704/8 |
| 2013/0254388 A1 * | 9/2013 | Gamaley ................. H04L 43/08 |
| | | 709/224 |
| 2014/0129357 A1 | 5/2014 | Goodwin |
| 2014/0297467 A1 * | 10/2014 | Soller .................... G06Q 50/01 |
| | | 705/26.8 |
| 2015/0049869 A1 | 2/2015 | Petrovykh et al. |
| 2015/0082139 A1 | 3/2015 | Carrier et al. |

\* cited by examiner

METHOD AND DEVICE FOR SELECTING A SERVICE PROCESSING MODE BASED ON HISTORICAL SUCCESS RATES

CROSS-REFERENCE TO RELATED APPLICATIONS

This application claims the benefit of priority from Chinese Patent Application No. 201510415993.3, filed on Jul. 15, 2015 entitled "Method and Apparatus for Service Processing," which is incorporated herein by reference in its entirety.

FIELD OF THE DISCLOSURE

The present disclosure relates to the field of information technology, in particular to a service processing method and a device.

DESCRIPTION OF RELATED ART

With the development of information technology, service processing tends to be international. Due to different service processing standards and requirements in different countries or areas, failures in service processing often occur in international service processing.

In a conventional service processing procedure, after a user terminal sends a service processing request to a server, the server determines a data interaction processing mode and channel, matching the service processing request, for handling the service processing request for the user terminal. In practice, multiple data interaction processing modes are frequently available which match the service processing request from the user terminal. In such cases, the server, in general, randomly or based on a processing parameter entered or selected by the user, selects a data interaction processing mode. With this procedure, failures in service processing often occur, affecting the success rate and the processing efficiency of service processing.

Frequent failures in service processing severely hinder the development of international services; thus, the problems of low success rates and low efficiency of service processing need to be solved.

SUMMARY

The present disclosure provides a service processing method and a device to solve the problems of low success rates and low efficiency of service processing in the prior art.

One embodiment of the present disclosure is drawn to a service processing method including receiving, by a server, a service processing request from a user terminal, the service processing request including data interaction processing mode information and account information, and determining, by the server based on the service processing request, one or more data interaction processing mode candidates for executing the service processing request. The one or more data interaction processing mode candidates are determined from a plurality of data interaction processing modes. Each of the plurality of data interaction processing modes includes processing parameters, and at least one of the processing parameters is different between different data interaction processing modes of the plurality of data interaction processing modes.

Each of the one or more data interaction processing mode candidates has an associated processing success rate based on a historical processing record of the plurality of data interaction processing modes. The service processing method also includes determining, by the server based on the processing success rate for each of the one or more data interaction processing mode candidates, a data interaction processing mode candidate as a data interaction processing mode for executing the service processing request.

One embodiment of the present disclosure is drawn to a service processing device including a processor and a non-transitory memory storing instructions executable by the processor. The instructions cause the service processing device to receive a service processing request from a user terminal, the service processing request including data interaction processing mode information and account information, and determine, based on the service processing request, one or more data interaction processing mode candidates for executing the service processing request. The one or more data interaction processing mode candidates are determined from a plurality of data interaction processing modes. Each of the plurality of data interaction processing modes includes processing parameters, and at least one of the processing parameters is different between different data interaction processing modes of the plurality of data interaction processing modes.

Each of the one or more data interaction processing mode candidates has an associated processing success rate based on a historical processing record of the plurality of data interaction processing modes. The instructions also cause the service processing device to determine, based on the processing success rate for each of the one or more data interaction processing mode candidates, a data interaction processing mode candidate as a data interaction processing mode for executing the service processing request.

One of the embodiments of the present disclosure is drawn to a non-transitory computer-readable storage medium storing computer executable instructions thereon. When executed by a processor of a service processing device, the instruction cause the service processing device to perform a method including receiving, by a server, a service processing request from a user terminal, the service processing request including data interaction processing mode information and account information, and determining, by the server based on the service processing request, one or more data interaction processing mode candidates for executing the service processing request. The one or more data interaction processing mode candidates are determined from a plurality of data interaction processing modes. Each of the plurality of data interaction processing modes includes processing parameters, and at least one of the processing parameters is different between different data interaction processing modes of the plurality of data interaction processing modes.

Each of the one or more data interaction processing mode candidates has an associated processing success rate based on a historical processing record of the plurality of data interaction processing modes. The method also includes determining, by the server based on the processing success rate for each of the one or more data interaction processing mode candidates, a data interaction processing mode candidate as a data interaction processing mode for executing the service processing request.

It is thus clear that in the embodiments of the present disclosure, a data interaction processing mode can be selected for handling the service processing request for the user terminal on the basis of the determined processing success rate for each data interaction processing mode candidate. This results in an improvement in the success rate and efficiency of service processing by servers incorporating the teachings disclosed herein.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views.

DETAILED DESCRIPTION

According to the present disclosure, a server determines at least one data interaction processing mode candidate after a receiving a service processing request from a user terminal, determines a processing success rate for each data interaction processing mode candidate, and determines the data interaction processing mode for handling the service processing request for the user terminal based on the processing success rates for each data interaction processing mode candidate. Therefore, according to the embodiments of the present disclosure, the data interaction processing mode can be selected for handling the service processing request for the user terminal on the basis of the determined processing success rates for each data interaction processing mode candidate, thus improving the success rate and efficiency of service processing.

The embodiments of the present application are described in further detail below with reference to the drawings.

Figure 1:
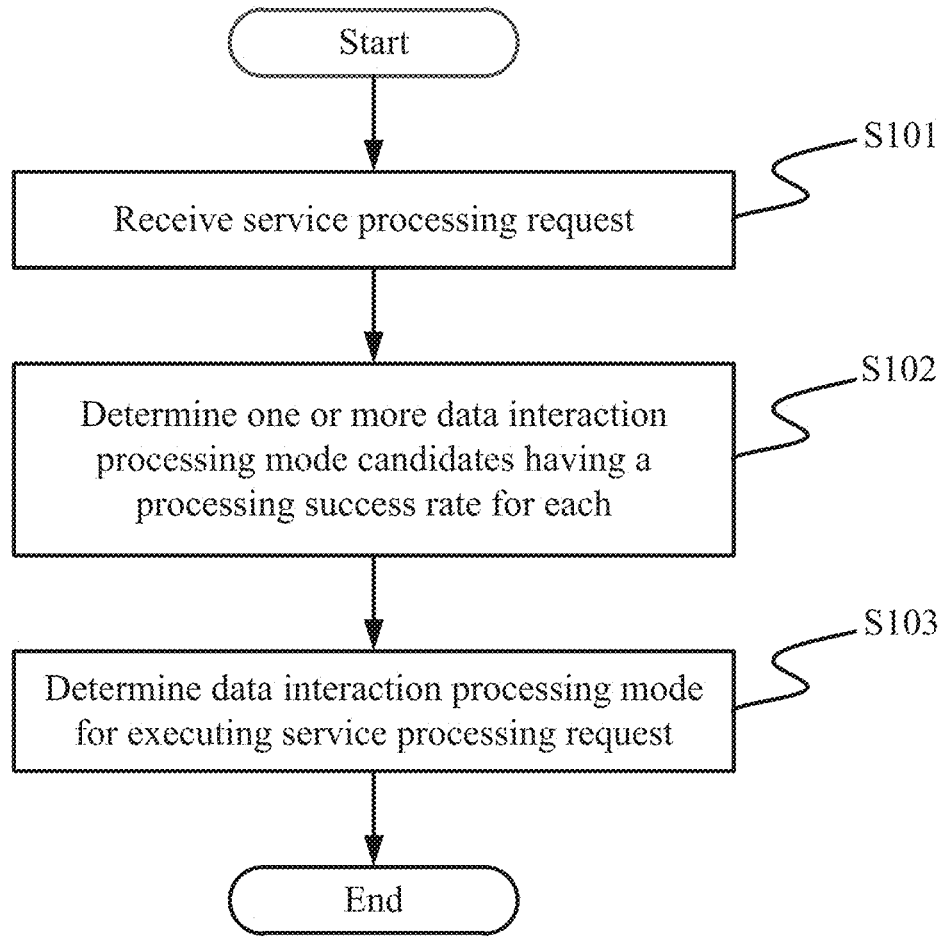
FIG. 1 illustrates a flow chart of a service processing method according to an embodiment of the disclosure.

FIG. 1 illustrates a flow chart of a service processing method in an embodiment of the disclosure. The embodiment comprises the following steps.

Step S101 is receiving, by a server, a service processing request from a user terminal. In practical application, the user terminal initiates a service processing request to the server based on a triggering action by a user. The services requested by the service processing request can be information acquisition, video/audio acquisition, payment services, and the like.

Step S102 is determining, based on the service processing request, at least one data interaction processing mode candidate for handling the service processing request, and determining, based on retrieved historical processing records for each data interaction processing mode candidate, processing success rates for each data interaction processing mode candidate. Each data interaction processing mode is characterized by processing parameters. At least one different processing parameter is present between different data interaction processing modes.

In practical application, the server, based on the service processing request from the user terminal, determines at least one data interaction processing mode that can satisfy the service processing request. The data interaction processing mode is represented by a combination of various processing parameters. The data interaction processing mode, and a data interaction processing channel discussed below, can be determined by a decision engine on the server. In one exemplary embodiment for international payment, one data interaction processing mode includes various processing parameters such as card verification value (CVV), billing address, 3D verification, and US dollar settlement. The 3D verification is an online payment security authentication service brought out for improving online payment security of credit cards or debit cards, guaranteeing online payment security for cardholders and safeguarding cardholders' interests. For non-3D verification processes, 3D verification is not needed. Another data interaction processing mode includes various processing parameters such as the CVV, billing address, 3D verification, and Euro settlement. The difference between the two data interaction processing modes lies in the settlement currency processing parameter. In particular, the former is settled in US dollars, and the latter is settled in Euros.

A processing success rate for each data interaction processing mode candidate satisfying the service processing request is determined based on a retrieved historical processing record for the data interaction processing mode candidate. In one embodiment, for each data interaction processing mode candidate, the processing success rates for the data interaction processing mode are determined based on stored historical processing records for the data interaction processing mode. In one embodiment, for each data interaction processing mode candidate, the processing success rates for the data interaction processing mode are determined based on the historical processing record of the data interaction processing mode and matching the account initiating the service processing request. The latter is a preferred embodiment of the present disclosure.

Specifically, the step is to retrieve, for each data interaction processing mode candidate, the historical processing record produced within a predetermined period of time and matching the data interaction processing mode candidate and account information carried in the service processing request. In one embodiment, the account information includes account ID information and/or account attribute information.

The retrieved historical processing record includes multiple records, where each record reflects one processing procedure and its result. The more records are collected from the retrieved historical processing record, the more accurate the calculated processing success rate is. In one embodiment, when the data interaction processing mode is to be determined, preference is given to processing records matching the account ID information carried in the service processing request to determine the processing success rate for the data interaction processing mode. When few processing records match the account ID information (i.e., when the number of processing records is not statistically significant), processing records matching the account attribute information (e.g., account type, service side for the account registration, and the like) in the service processing request are retrieved to determine the processing success rate for the data interaction processing mode. For example, when little historical payment data of an international credit card initiating a payment request can be retrieved, historical payment data with respect to the same issuing bank, same card brand, same card type and bank identification number (BIN) can be retrieved and used.

In one embodiment, when determining the processing success rate for the data interaction processing mode based on the retrieved historical process record, the successful processing times recorded in the retrieved historical processing record is divided by the total amount of processing times to determine the processing success rate. In one embodiment, the processing success rate is predicted using a time sequence prediction, i.e., statistics are calculated with respect to processing success rates at a series of points in time in the past. The processing success rates are arranged in chronological order, i.e., time series, and the time-varying pattern of the processing success rate is identified by analyzing the time series to obtain a model, and the service processing success rate can be predicted based on the obtained model.

Step S103 is determining, based on the processing success rates for each data interaction processing mode candidate, a data interaction processing mode for handling the service processing request for the user terminal. In one embodiment, the data interaction processing mode candidate with the highest processing success rate is selected for handling the service processing request for the user terminal. In one embodiment, the data interaction processing mode for handling the service processing request for the user terminal is determined by at least one of the following two exemplary methods.

Method 1 is selecting, from various data interaction processing mode candidates, the data interaction processing mode with the highest processing success rate for handling the service processing request for the user terminal.

Method 2 is determining, based on the processing success rate for each data interaction processing mode candidate and user feedback, the data interaction processing mode for handling the service processing request for the user terminal.

Specifically, the step includes sending, based on the processing success rate for each data interaction processing mode, a parameter validation instruction message to the user terminal, in order to instruct a user to select a processing parameter (e.g., US dollar settlement or Euro settlement) and/or to enter a processing parameter (e.g., specific billing address). The step also includes determining, based on the parameter information of the processing parameter selected and/or the processing parameter entered by the user and fed back through the user terminal, the data interaction processing mode for handling the service processing request for the user terminal.

With method 2, the user can, based on the processing success rate for each data interaction processing mode, be prompted to select a processing parameter and/or enter a processing parameter. The selection priority information of processing parameters is displayed to the user. For example, if the determined data interaction processing mode with the highest processing success rate includes processing parameters such as US dollar settlement, the user then can be instructed to give preference to US dollar settlement during the selection of the settlement currency. Also, the user can also be prompted to enter required parameter information relating to the data interaction processing mode with the highest processing success rate. For example, besides processing parameters such as US dollar settlement, the data interaction processing mode with the highest processing success rate further includes processing parameters such as the CVV and billing address; thus, the user can be instructed to enter the CVV information and specific billing address.

In some embodiments, determining, based on the parameter information of the processing parameter selected and/or entered by the user and fed back through the user terminal, the data interaction processing mode for handling the service processing request for the user terminal includes determining, from the at least one data interaction processing mode candidate, data interaction processing modes matching the parameter information of the processing parameter selected and/or entered by the user, and selecting, from the determined data interaction processing modes matching the parameter information of the processing parameter selected and/or entered by the user, the data interaction processing mode with the highest processing success rate for handling the service processing request for the user terminal.

In practical application, the user does not necessarily select a processing parameter and enter a parameter according to prompts from the server. For instance, in the above process, the user may select Euro settlement instead of US dollar settlement, and may not enter CVV information and/or a specific billing address according to instructions from the server. When determining the final data interaction processing mode, the data interaction processing mode with the highest processing success rate is then selected from data interaction processing modes matching the processing parameter selected by the user and/or parameter information entered by the user.

In addition to the data interaction processing mode, the final processing success rate is also affected by a data interaction processing channel (including service interface information for handling the service processing request). The selection of the data interaction processing channel is specified below.

Figure 2:
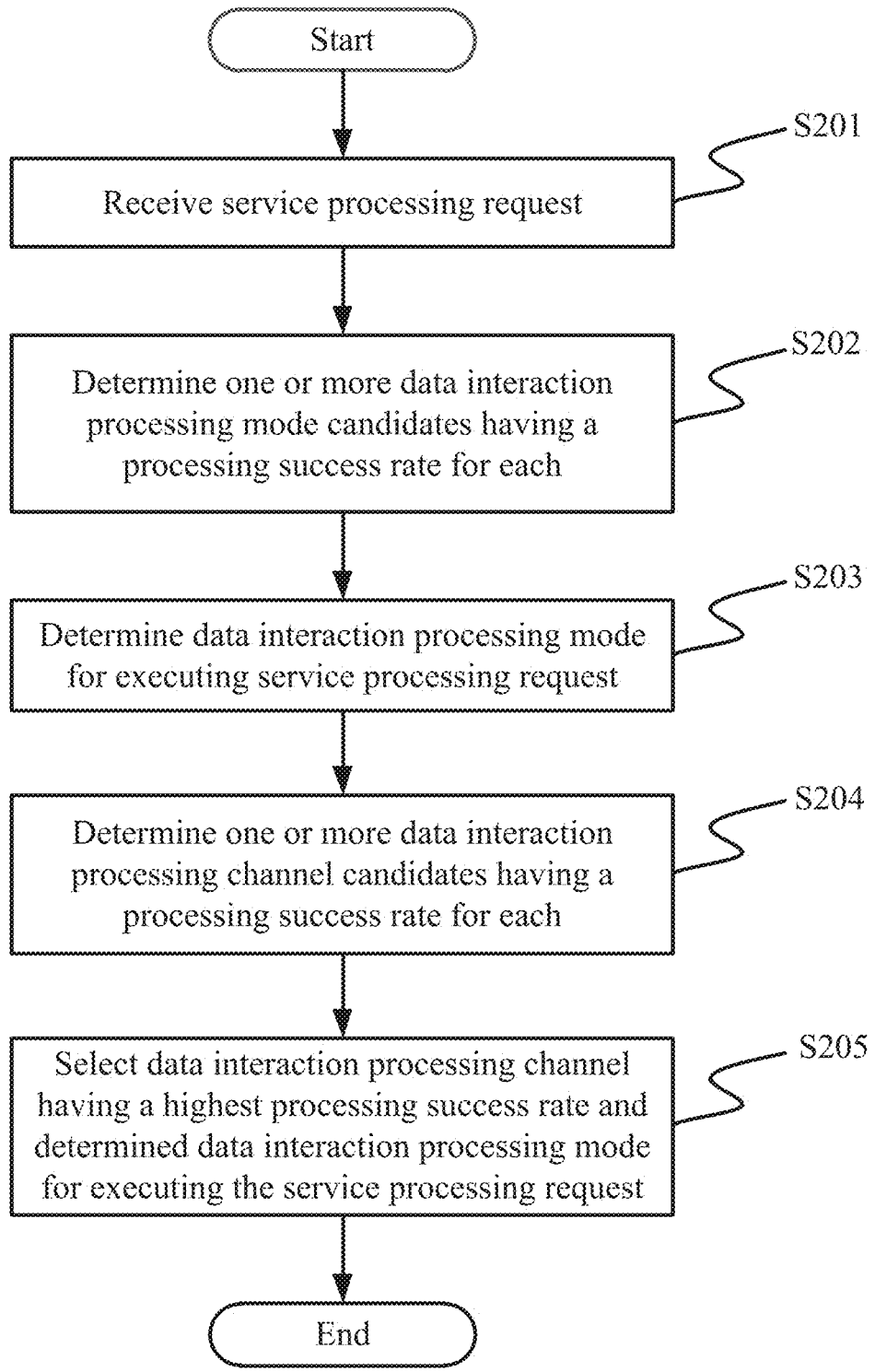
FIG. 2 illustrates a flow chart of a service processing method according to an embodiment of the disclosure.

FIG. 2 illustrates a flow chart of the service processing method in an embodiment of the disclosure. The method includes the following steps.

Step S201 is receiving, by a server, a service processing request from a user terminal.

Step S202 is determining, based on the service processing request, at least one data interaction processing mode candidate for handling the service processing request, and determining, based on retrieved historical processing records for each data interaction processing mode candidate, processing success rates for each data interaction processing mode candidate, wherein at least one different processing parameter is present among different data interaction processing modes.

In one embodiment, the process of retrieving the historical processing record for each data interaction processing mode candidate includes retrieving, for each data interaction processing mode candidate, the historical processing record produced within a predetermined period of time and matching the data interaction processing mode and account information carried in the service processing request. In one embodiment, the account information includes account ID information and/or account attribute information.

Step S203 is determining, based on the processing success rates for each data interaction processing mode candidate, a data interaction processing mode for handling the service processing request for the user terminal.

In one embodiment, the step includes selecting the data interaction processing mode with a highest processing success rate for handling the service processing request for the user terminal from various data interaction processing modes. In one embodiment, the step includes sending a parameter validation instruction message to the user terminal based on the processing success rate for each data interaction processing mode candidate, where the validation instruction message is used to instruct a user to select a processing parameter and/or enter a processing parameter, and determining, based on the parameter information of the processing parameter selected by the user and/or entered by the user and fed back through the user terminal, the data interaction processing mode for handling the service processing request for the user.

Step S204 is determining at least one data interaction processing channel candidate matching the service processing request and the determined data interaction processing mode for handling the service processing request for the user terminal, and determining, based on the retrieved historical processing record for each data interaction processing channel candidate, processing success rates for each data interaction processing channel candidate. The data interaction processing channel includes service interface information for handling the service processing request.

Here, the data interaction processing channel in the embodiments of the present disclosure refers to a variety of service interface information required for handling a service required by a user for the data interaction processing mode determined for handling the service for the user terminal. For example for payment services, the data interaction processing channel can include different channel interface information for international card payment channel (channel W, channel H, channel C), different channel interface information for local card payment channel (channel Y, channel E, channel G), and service interface information from third-party payment companies.

In one embodiment, similar to retrieving the historical processing records for each data interaction processing mode discussed above, the process for retrieving the historical processing record for each data interaction processing mode candidate in this embodiment is as follows.

The process includes retrieving the historical processing record produced within a predetermined period of time, and matching the data interaction processing channel candidate, account information carried in the service processing request, and the determined data interaction processing mode for handling the service processing request for the user terminal for each data interaction processing channel candidate. In one embodiment account information includes account ID information and/or account attribute information.

In practical application, for each data interaction processing channel, the historical processing record matching the data interaction processing channel can be retrieved from the historical processing record corresponding to the data interaction processing mode determined for handling the service processing request for the user terminal. The retrieved historical processing record includes multiple records, where each record reflects one processing procedure and its result. The more records are collected from the further retrieved historical processing record, the more accurate the calculated processing success rate is. In practical application, provided that the data interaction processing mode matches the data interaction processing channel, the historical processing record matching the account ID information carried in the service processing request can be preferably selected to determine the processing success rate for the data interaction processing channel. When few processing records match the account ID information, the processing records matching the account attribute information relating to the service processing request can be retrieved to determine the processing success rate for the data interaction processing channel.

In one embodiment, when determining the processing success rate for each processing channel, the processing success rate can be predicted with a time sequence prediction method, i.e., statistics are calculated with respect to the processing success rates at a series of points in time in the past. The processing success rates are arranged in chronological order, i.e., time series, and the time-varying pattern of the processing success rate is identified by analyzing the time series to obtain a model, and the service processing success rate can be predicted based on the obtained model.

Step S205 is adopting, from the determined data interaction processing modes, the data interaction processing channel with the highest processing success rate for handling the service processing request for the user terminal.

The method according to the above embodiments of the present disclosure is further described in detail below with reference to specific applications.

Figure 3:
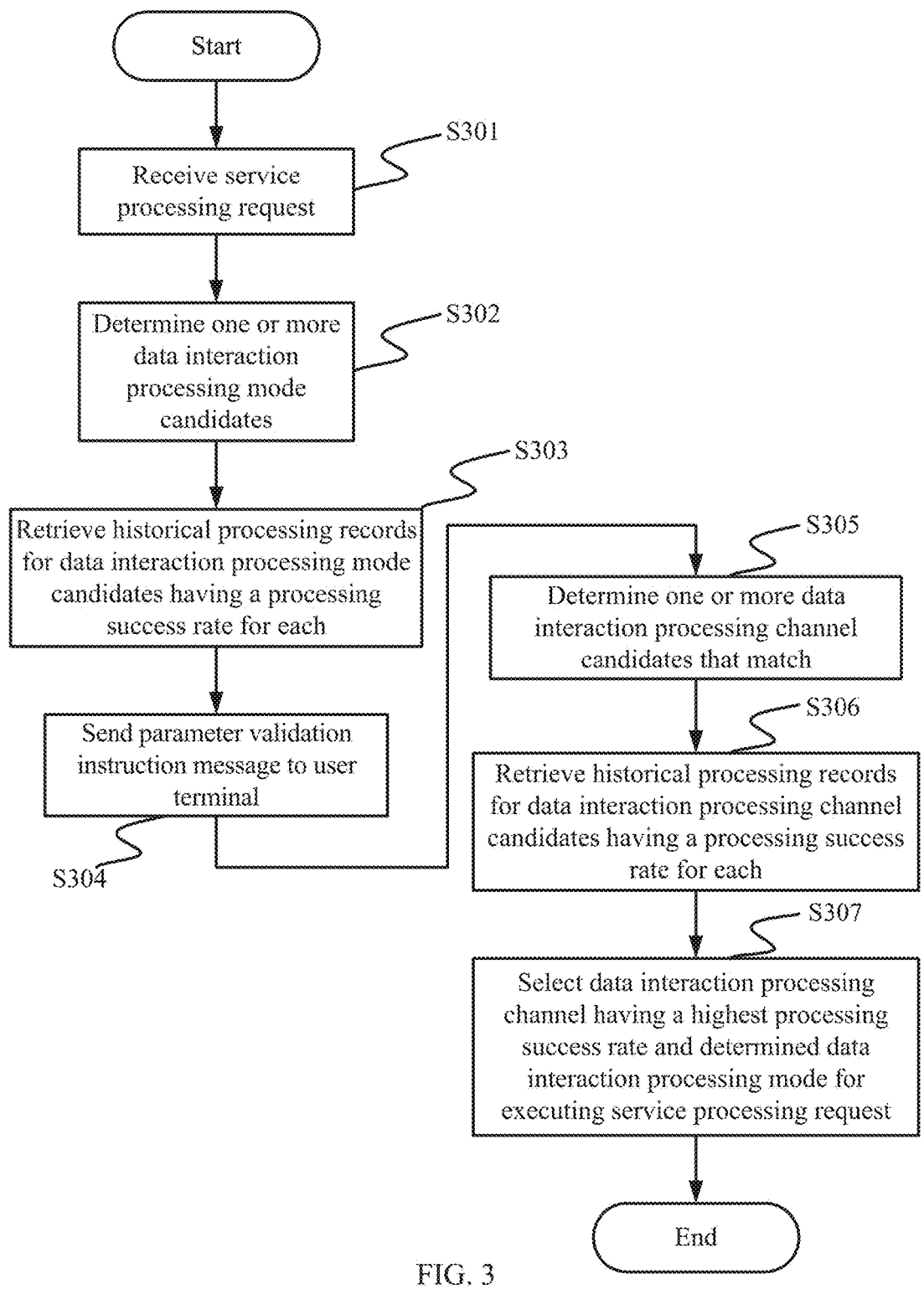
FIG. 3 illustrates a flow chart of a service processing method according to an embodiment of the disclosure.

FIG. 3 illustrates a flow chart of the service processing method in an embodiment of the disclosure. The method includes the following steps.

Step S301 is receiving, by a server, a service processing request from a user terminal. Here, taking a payment request as an example for the service processing request, the service processing request from the user terminal may include payment card information, commodity/service information and terminal equipment information. The payment card information may comprise: card brand (such as VISA, MASTERCARD, or MAESTRO), card type (such as infinite card, platinum card, gold card, or ordinary card), card issuing bank (such as Wells Fargo, CITI Bank, HSBC, or Barclays Bank), and acquiring bank (such as ABC, ICBC, or DBS). The commodity/service information may include, for example, merchant/server identifier, commodity category, and payment amount. The terminal equipment information may include, for example, equipment type (such as PC, PAD, and mobile terminal), geographical location of payment equipment, and payment time.

For example, a service processing request from a user terminal can include the following.

Commodity information: a) service merchant: merchant X; b) merchant category: mobile phone; c) amount: USD 200.

Terminal equipment information: a) equipment type: Android mobile phone; b) geographical location: Samara, Samara Oblast, Russia; c) payment time: 9:23 p.m. (local time). Payment card information: a) card issuing country: Russia; b) issuing bank: SBERBANK OF RUSSIA; c) card brand: MasterCard; d) card type: platinum card; e) card No.: 546938******8888.

Step S302 is determining, based on the service processing request, at least one data interaction processing mode candidate for handling the service processing request, wherein at least one different processing parameter is present among different data interaction processing modes.

The decision engine on the server combines various processing parameters. Each combination serves as a data interaction processing mode, as shown in Table 1 below (prediction period and payment success rate in Table 1 will be illustrated in the following steps).

TABLE 1

| SN | Data interaction processing mode (combination of processing parameters) | Prediction period | Predicted processing success rate |
|---|---|---|---|
| 1 | CVV, billing address, non-3D verification, and US dollar settlement | 1 day | 91.9% |
| 2 | CVV, billing address, non-3D verification, and Euro settlement | 3 days | 90.7% |
| 3 | CVV, billing address, 3D verification, and US dollar settlement | 2 days | 89.3% |
| 4 | No CVV, billing address, non-3D verification, and US dollar settlement | 1 day | 88.6% |
| . . . . . . | | . . . | . . . |

Step S303 is retrieving, for each data interaction processing mode candidate, the historical processing record produced within a predetermined period of time and matching the data interaction processing mode and account information carried in the service processing request, and determining, based on the retrieved historical processing records, processing success rates for the data interaction processing mode candidates. In one embodiment, the account information includes account ID information and/or account attribute information.

In practical application, the decision engine selects the historical processing record for the account (such as credit card No.) related to the service processing request to calculate statistics on the processing success rate. For example, the historical processing record for the account related to the service processing request can include Record 1: spending USD 16 on a pair of leather shoes on AliExpress platform at 16:45 p.m. (GMT) on Jan. 15, 2014; in Samara, Samara Oblast, Russia, payment via a card numbered (credit card No.) 546938******8888 by virtue of PC; payment succeeded via international card processing channel W; Record 2: . . . , etc. There could be 12 orders, for example, for this account in total, by which 3 payment channels are used for 15 payment times, payment success rate accounting for 80% and order success rate accounting for 100%.

When there are few historical processing records of a payment account related to the service processing request, i.e., the number of processing records is not statistically significant, the processing success rate for different data interaction processing modes can be determined on the basis of the historical processing records of all payment accounts with respect to the service processing request, with the same issuing bank, same card brand, same card type and same card BIN.

In one embodiment, this service processing success rate can be determined by time sequence prediction, i.e., statistics are calculated with respect to processing success rates of each time point in the past. These processing success rates are arranged in chronological order, i.e., time series, and the time-varying pattern of the processing success rate is identified by analyzing the time series to obtain a model, and the service processing success rate can be predicted based on the obtained model.

As described above, Table 1 shows examples of the predicted processing success rates for different data interaction processing modes. The prediction period (i.e., the statistical time length) corresponds to a set recent time period.

Step S304 is sending, based on the processing success rates for each data interaction processing mode candidate, a parameter validation instruction message to the user terminal, where the parameter validation instruction message is used for instructing a user to select a processing parameter and/or to enter a processing parameter, and determining, based on the parameter information of the processing parameter selected and/or entered by the user and fed back through the user terminal, the data interaction processing mode for handling the service processing request for the user terminal.

According to the data in Table 1, the processing success rate is the highest in the case of data interaction processing mode 1, in which the user needs to input the CVV, billing address, and select settlement currency. The user will be prompted to fill in the CVV and billing address and select US dollar settlement by the parameter validation instruction message sent to the user terminal. Here, the user can refrain from filling in the CVV and billing address or selecting the US dollar settlement. If the user does not fill in the CVV or billing address, or selects other settlement currencies (such as Euro settlement), various processing parameters are required to be integrated to form a new data interaction processing mode in combination with the feedback information from the user terminal. Assuming that the user fills in the CVV and billing address, but selects Euro settlement, the data interaction processing mode for handling the service processing request for the user will finally be determined to be data interaction processing mode 2, as shown in Table 1.

Step S305 is determining at least one data interaction processing channel candidate matching the service processing request and the determined data interaction processing mode for handling the service processing request for the user terminal. The data interaction processing channel includes a variety of service interface information for handling the service processing request.

Here, the decision engine determines the matched processing channel by referencing to the information, such as the card issuing country in the service processing request and the limitations on various processing parameters in the data interaction processing mode determined for handling services for the user terminal, as shown in Table 2 below.

TABLE 2

| SN | Data interaction processing channel | Forecasting period | Predicting this processing success rate |
|---|---|---|---|
| 1 | International card payment channel W | 1 day | 92.1% |
| 2 | International card payment channel H | 2 days | 91.6% |
| 3 | International card payment channel C | 5 days | 91.3% |
| ... | ... | ... | ... |

Step S306 is retrieving the historical processing record produced within a predetermined period of time and matching the data interaction processing channel candidate, account information carried in the service processing request, and the determined data interaction processing mode for handling the service processing request for the user terminal for each data interaction processing channel candidate, and determining, based on the retrieved historical processing record, processing success rates for each data interaction processing channel candidate. In one embodiment, account information includes account ID information and/or account attribute information.

In practical application, the historical processing record that matches each data interaction processing channel can be retrieved from the historical processing records corresponding to the finally determined data interaction processing mode. This processing success rate for each data interaction processing channel can be predicted based on the further retrieved historical processing record. The prediction method as shown in the embodiments described above is also used in this embodiment for the prediction of the processing success rate for each data interaction processing mode. Thus, it will not be described in detail here, but exemplary results of the prediction can be seen in Table 2.

Step S307 is adopting, from the determined data interaction processing modes, the data interaction processing channel with the highest processing success rate for handling the service processing request for the user terminal. As shown in Table 2, data interaction processing channel 1 is selected for handling services for the user terminal.

In one embodiment, successful processing instruction information can be sent to the user terminal when successful processing is confirmed. Also, information, such as the data interaction processing mode and the data interaction processing channel, applied at this time can be stored for future use when the user terminal initiates service processing requests.

Based on the same inventive concept, the present disclosure further provides a service processing device corresponding to the service processing method. The theory of the device is similar to the service processing method provided by the present disclosure; therefore, the implementation of the method can be found in the implementation of the device, and certain portions of the description detailed above will not be repeated in full below.

Figure 4:
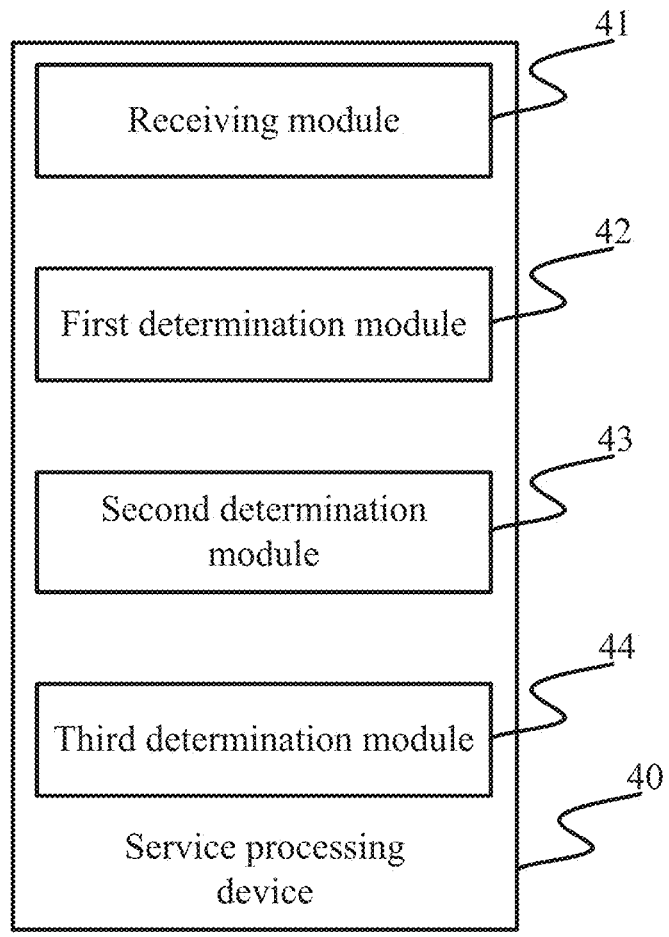
FIG. 4 illustrates a schematic structural diagram of a service processing device according to an embodiment of the disclosure.

FIG. 4 illustrates the structure of the service processing device 40 in an embodiment of the present disclosure. The service processing device comprises the following elements.

A receiving module 41, is configured for receiving a service processing request from a user terminal.

A first determination module 42, is configured for determining, based on the service processing request, at least one data interaction processing mode candidate for handling the service processing request, and determining, based on a retrieved historical processing record for each data interaction processing mode candidate, a processing success rate for each data interaction processing mode candidate. At least one different processing parameter is present between different data interaction processing modes.

A second determination module 43 is for determining, based on processing success rates for each data interaction processing mode candidate, a data interaction processing mode for handling the service processing request for the user terminal.

In some embodiments, the first determination module 42 is further configured for retrieving the historical processing record for each interactive processing mode candidate by retrieving the historical processing record produced within a predetermined period of time and matching the data interaction processing mode candidate and account information carried in the service processing request for each data interaction processing mode candidate. The account information includes, for example, account ID information and/or account attribute information.

In some embodiments, the second determination module 43 is further configured for selecting, from various data interaction processing mode candidates, the data interaction processing mode with the highest processing success rate for handling the service processing request for the user terminal.

In some embodiments, the second determination module 43 is further configured for sending, based on the processing success rates for each data interaction processing mode candidate, a parameter validation instruction message to the user terminal, wherein the parameter validation instruction message is used for instructing a user to select a processing parameter and/or to enter a processing parameter. In these embodiments, the second determination module is also configured for determining, based on the parameter information of the processing parameter selected and/or entered by the user and fed back through the user terminal, the data interaction processing mode for handling the service processing request for the user terminal.

In some embodiments, the second determination module 43 is further configured for determining, from the at least one data interaction processing mode candidate, data interaction processing modes matching the parameter information of the processing parameter selected and/or entered by the user, and selecting, from the determined data interaction processing mode candidates matching the parameter information of the processing parameter selected and/or entered by the user, the data interaction processing mode with the highest processing success rate for handling the service processing request for the user terminal.

In some embodiments, the device further includes a third determination module 44, used for, after the second determination module determines the data interaction processing modes for handling the service processing request for the user terminal, determining at least one data interaction processing channel candidate matching the service processing request and the determined data interaction processing modes for handling the service processing request for the user terminal. The third determination module 44 is also configured for determining, based on the retrieved historical processing record for each data interaction processing channel candidate, processing success rates for each data interaction processing channel candidate, where the data interaction processing channel comprises a variety of service interface information for handling the service processing request, and adopting, from the determined data interaction processing modes, the data interaction processing channel with the highest success rate for handling the service processing request for the user terminal.

In some embodiments, the third determination module 44 is further configured for retrieving the historical processing record for each interactive processing channel candidate by retrieving the historical processing record produced within a predetermined period of time and matching the data interaction processing channel candidate, account information carried in the service processing request, and the determined data interaction processing mode for handling the service processing request for the user terminal for each data interaction processing channel candidate. In one embodiment, the account information includes account ID information and/or account attribute information.

A person skilled in the art should understand that the embodiments of the present disclosure can take the form of a method, system, or computer program product. Accordingly, the present disclosure can have an entire hardware embodiment, entire software embodiment, or embodiment of the combination of software and hardware. In addition, the present disclosure can be in the form of a computer program product that is implemented on one or more computer storage media (including, but not limited to disk storage, CD-ROM and optical storage device) with computer applicable program codes.

The present disclosure is described with reference to the flow chart and/or block chart of the method, device (system), and computer program product in the embodiments herein. It should be understood that each process and/or block in the flow chart and/or the block chart, as well as the combination thereof, can be implemented by computer program instructions executed on one or more processors. Those computer program instructions can be provided to a general purpose computer, a dedicated computer, or an embedded processor or processors of other programmable data processing devices to form a machine, so that the instructions executed by the computer or other programmable data processing devices can form an apparatus implementing the functions designated in one or more processes in the flow chart and/or one or more blocks in the block chart.

Those computer program instructions can also be stored in a computer-readable memory, capable of leading the computer or other programmable data processing devices to operate in a specific way, so that the instructions stored in the computer-readable memory can generate manufactured products comprising the instruction apparatus; and the instruction apparatus can implement the functions designated in one or more processes in the flow chart and/or one or more blocks in the block chart.

Those computer program instructions can be loaded into a computer or other programmable data processing devices via a memory, and then the computer or other programmable data processing devices may execute a series of operating steps to perform the processing by the computer. Consequently, the instructions executed by the computer or other programmable devices may provide for execution of the steps for implementing the functions designated in one or more processes in the flow charts and/or one or more blocks in the schematic structural diagram described herein.

Although preferred embodiments herein have been described, a person skilled in the art can make additional variations and modifications to these embodiments once the basic inventive concept is known. Thus, the attached claims are intended to include the preferred embodiments and encompass all variations and modifications available to one of ordinary skill in the art within the scope of the disclosure. It is obvious that a person skilled in the art can make variations and modifications to the present disclosure without departing from the spirit and scope of the present disclosure. Thus, if these variations and modifications of the present disclosure fall within the scope of the claims of the present disclosure and the equivalent technologies thereof, these are also intended to be encompassed by the present disclosure.

What is claimed is:

1. A service processing method comprising:
   receiving, by a server, a service processing request from a user terminal, the service processing request including data interaction processing mode information and account information;
   determining, by the server based on the service processing request, candidates of one or more data processing modes for executing the service processing request, the candidates of one or more data interaction processing modes being determined from a plurality of data interaction processing modes, each of the plurality of data interaction processing modes including processing parameters, and at least one of the processing parameters being different between different data interaction processing modes of the plurality of data interaction processing modes;
   calculating, by the server, processing success rates for each of the candidates of one or more data interaction processing modes, the calculating a processing success rate for a given data interaction processing mode comprising:
      retrieving a historical processing record for the given data interaction processing mode, the historical processing record associated with a predetermined historical period of time,
      matching the given data interaction processing mode and account information in the service processing request, and
      determining a processing success rate for the given data interaction processing mode based on the historical processing record matching the account;
   determining, by the server based on the processing success rate for each of the candidates of one or more data interaction processing modes, a candidate of a data interaction processing mode as a data interaction processing mode for executing the service processing request;
   transmitting, by the server, a prompt to the user terminal, the prompt including a request for information required by the candidate of the data interaction processing mode;
   identifying, by the server, a candidate processing channel based on the information submitted via the prompt, the candidate processing channel identified from a set of processing channels, each of the set of processing channels being associated with a processing success rate; and
   executing, by the server, a transaction using the candidate processing channel and the candidate of the data interaction processing mode.

2. The service processing method according to claim 1, wherein the historical processing record of the plurality of candidates of data interaction processing modes is produced over a predetermined period of time and matches the data interaction processing mode information and the account information, and
   wherein the account information includes at least one of account ID information and account attribute information.

3. The service processing method according to claim 1, wherein determining the data interaction processing mode further comprises:
   selecting, from the candidates of one or more data interaction processing modes, a candidate of a data interaction processing mode having a highest processing success rate for executing the service processing request.

4. The service processing method according to claim 1, wherein determining the data interaction processing mode further comprises:
   sending, based on the processing success rate for each of the candidates of one or more data interaction processing modes, a parameter validation instruction message to the user terminal, the parameter validation instruction message prompting a user to perform one or more response actions selected from a group of response actions consisting of selecting a processing parameter or entering a processing parameter,
   wherein the determining the candidates of a data interaction processing mode as the data interaction processing mode for executing the service processing request is further based on parameter information in a response to the parameter validation instruction message received from the user terminal.

5. The service processing method according to claim 4, wherein the determining the data interaction processing mode further comprises:
   determining, from the candidates of one or more data interaction processing modes, data interaction processing modes matching the parameter information in the response received from the user terminal; and
   selecting, from the determined data interaction processing modes matching the parameter information, a data interaction processing mode having a highest processing success rate for executing the service processing request.

6. The service processing method according to claim 1, further comprising:
   determining, based on the service processing request, one or more data interaction processing channel candidates matching the service processing request and the determined data interaction processing mode, the one or more data interaction processing channel candidates being determined from a plurality of data interaction processing channels, each of the plurality of data interaction processing channels including service interface information for handling the service processing request, each of the one or more data interaction processing channel candidates having an associated processing success rate based on a historical processing record of the plurality of data interaction processing channels; and selecting, from the one or more data interaction processing channel candidates, a data interaction processing channel candidate having a highest processing success rate as a data interaction processing channel for executing the service processing request, wherein the determining the one or more data interaction processing channel candidates and the selecting the data interaction processing channel are performed after the determining the data interaction processing mode for handling the service processing request.

7. The service processing method according to claim 6, wherein the historical processing record of the plurality of data interaction processing channels is produced over a predetermined period of time, wherein a portion of the historical processing record is retrieved for determining the processing success rate for each of the one or more data interaction processing channel candidates, the portion matching the one or more data interaction processing channel candidates, the account information in the service processing request, and the data interaction processing mode for executing the service processing request, and wherein the account information includes at least one of account ID information and account attribute information.

8. The service processing method according to claim 6, wherein the processing success rate associated to each of the one or more interaction processing channel candidates is determined by the server based on the historical processing record of the plurality of data interaction processing channels.

9. The service processing method according to claim 1, wherein the processing success rate associated to each of the candidates of one or more interaction processing modes is determined by the server based on the historical processing record of the plurality of data interaction processing modes.

10. A service processing device comprising:
a processor;
a non-transitory memory storing instructions executable by the processor, the instructions causing the service processing device to:
receive a service processing request from a user terminal, the service processing request including data interaction processing mode information and account information;
determine, based on the service processing request, candidates of one or more data interaction processing modes for executing the service processing request, the candidates of one or more data interaction processing modes being determined from a plurality of data interaction processing modes, each of the plurality of data interaction processing modes including processing parameters, and at least one of the processing parameters being different between different data interaction processing modes of the plurality of data interaction processing modes;
calculate processing success rate s for each of the candidates of one or more data interaction processing modes, the calculating a processing success rate for a given data interaction processing mode comprising:
retrieving a historical processing record for the given data interaction processing mode, the historical processing record associated with a predetermined historical period of time,
matching the given data interaction processing mode and account information in the service processing request, and
determining a processing success rate for the given data interaction processing mode based on the historical processing record matching the account;
determine, based on the processing success rate for each of the candidates of one or more data interaction processing modes, a candidate of a data interaction processing mode as a data interaction processing mode for executing the service processing request;
transmit a prompt to the user terminal, the prompt including a request for information required by the candidate of the data interaction processing mode;
identify a candidate processing channel based on the information submitted via the prompt, the candidate processing channel identified from a set of processing channels, each of the set of processing channels being associated with a processing success rate; and
execute a transaction using the candidate processing channel and the candidate of the data interaction processing mode.

11. The service processing device according to claim 10, wherein the historical processing record of the plurality of candidates of data interaction processing modes is produced over a predetermined period of time and matches the data interaction processing mode information and the account information, and wherein the account information includes at least one of account ID information and account attribute information.

12. The service processing device according to claim 10, wherein the determining the data interaction processing mode instruction further causes the service processing device to:
select, from the candidates of one or more data interaction processing modes, a candidate of a data interaction processing mode having a highest processing success rate for executing the service processing request.

13. The service processing device according to claim 10, wherein the determining the data interaction processing mode instruction further causes the service processing device to:
send, based on the processing success rate for each of the candidates of one or more data interaction processing modes, a parameter validation instruction message to the user terminal, the parameter validation instruction message prompting a user to perform one or more response actions selected from a group of response actions consisting of
selecting a processing parameter and
entering a processing parameter,
wherein the instruction to determine the candidate of a data interaction processing mode as the data interaction processing mode for executing the service processing request is further based on parameter information in a response to the parameter validation instruction message received from the user terminal.

14. The service processing device according to claim 13, wherein the determining the data interaction processing mode instruction further causes the service processing device to:
determine, from the candidates of one or more data interaction processing modes, data interaction processing modes matching the parameter information in the response received from the user terminal; and select, from the determined data interaction processing modes matching the parameter information, a data interaction processing mode having a highest processing success rate for executing the service processing request.

15. The service processing device according to claim 10, the instructions further causing the service processing device to:

determine, based on the service processing request, one or more data interaction processing channel candidates matching the service processing request and the determined data interaction processing mode, the one or more data interaction processing channel candidates being determined from a plurality of data interaction processing channels, each of the plurality of data interaction processing channels including service interface information for handling the service processing request, and determine, based on a historical processing record of the plurality of data interaction processing channels, a processing success rate for each of the one or more data interaction processing channel candidates; and select, from the one or more data interaction processing channel candidates, a data interaction processing channel candidate having a highest processing success rate as a data interaction processing channel for executing the service processing request, wherein the instruction to determine the one or more data interaction processing channel candidates and the instruction to select the data interaction processing channel are performed after the instruction to determine the data interaction processing mode for handling the service processing request.

16. The service processing device according to claim 15, wherein the historical processing record of the plurality of data interaction processing channels is produced over a predetermined period of time, wherein only a portion of the historical processing record is retrieved to determine the processing success rate for each of the one or more data interaction processing channel candidates, the portion matching the one or more data interaction processing channel candidates, the account information in the service processing request, and the data interaction processing mode for executing the service processing request, and wherein the account information includes at least one of account ID information and account attribute information.

17. The service processing device according to claim 15, wherein the processing success rate associated to each of the one or more interaction processing channel candidates is determined by the server based on the historical processing record of the plurality of data interaction processing channels.

18. The service processing method according to claim 10, wherein the processing success rate associated to each of the candidates of one or more interaction processing modes is determined by the server based on the historical processing record of the plurality of data interaction processing modes.

19. A non-transitory computer-readable storage medium storing computer executable instructions thereon that, when executed by a processor of a service processing device, cause the service processing device to perform a method comprising:

receiving, by a server, a service processing request from a user terminal, the service processing request including data interaction processing mode information and account information;

determining, by the server based on the service processing request, candidates of one or more data interaction processing modes for executing the service processing request, the candidates of one or more data interaction processing modes being determined from a plurality of data interaction processing modes, each of the plurality of data interaction processing modes including processing parameters, and at least one of the processing parameters being different between different data interaction processing modes of the plurality of data interaction processing modes;

calculating, by the server, processing success rate s for each of the candidates of one or more data interaction processing modes, the calculating a processing success rate for a given data interaction processing mode comprising:

retrieving based on a historical processing record for the given data interaction processing mode, the historical processing record associated with a predetermined historical period of time, matching the given data interaction processing mode and account information in the service processing request, and determining a processing success rate for the given data interaction processing mode based on the historical processing record matching the account;

determining, by the server based on the processing success rate for each of the candidates of one or more data interaction processing modes, a candidate of a data interaction processing mode as a data interaction processing mode for executing the service processing request;

transmitting, by the server, a prompt to the user terminal, the prompt including a request for information required by the candidate of the data interaction processing mode;

identifying, by the server, a candidate processing channel based on the information submitted via the prompt, the candidate processing channel identified from a set of processing channels, each of the set of processing channels being associated with a processing success rate; and executing, by the server, a transaction using the candidate processing channel and the candidate of the data interaction processing mode.

20. The non-transitory computer-readable storage medium according to claim 19, the method further comprising:

determining, based on the service processing request, one or more data interaction processing channel candidates matching the service processing request and the determined data interaction processing mode, the one or more data interaction processing channel candidates being determined from a plurality of data interaction processing channels, each of the plurality of data interaction processing channels including service interface information for handling the service processing request, each of the one or more data interaction processing channel candidates having an associated processing success rate based on a historical processing record of the plurality of data interaction processing channels; and selecting, from the one or more data interaction processing channel candidates, a data interaction processing channel candidate having a highest processing success rate as a data interaction processing channel for executing the service processing request,
wherein the determining the one or more data interaction processing channel candidates and the selecting the data interaction processing channel are performed after the determining the data interaction processing mode for handling the service processing request.

* * * * *